US006764262B1

(12) United States Patent
Hargis

(10) Patent No.: US 6,764,262 B1
(45) Date of Patent: Jul. 20, 2004

(54) WEATHERPROOF FASTENER

(75) Inventor: Joe A. Hargis, Tyler, TX (US)

(73) Assignee: Hargis Industries L.P., Tyler, TX (US)

( * ) Notice: Subject to any disclaimer, the term of this patent is extended or adjusted under 35 U.S.C. 154(b) by 0 days.

(21) Appl. No.: 10/359,427

(22) Filed: Feb. 7, 2003

Related U.S. Application Data

(60) Provisional application No. 60/368,719, filed on Apr. 1, 2002.

(51) Int. Cl.[7] ........................... F16B 33/00; F16B 43/00
(52) U.S. Cl. ................... 411/371.1; 411/369; 411/542; 411/907
(58) Field of Search .................. 411/369, 370, 411/371.1, 533, 542, 907

(56) References Cited

U.S. PATENT DOCUMENTS

| | | | | | |
|---|---|---|---|---|---|
| 3,399,589 | A | * | 9/1968 | Breed ...................... | 411/369 X |
| 3,452,636 | A | * | 7/1969 | Cohen et al. ............ | 411/369 X |
| 4,701,088 | A | * | 10/1987 | Crull ........................... | 411/369 |
| 5,622,464 | A | * | 4/1997 | Dill et al. ............... | 411/369 X |
| 6,231,286 | B1 | * | 5/2001 | Bogatz et al. ........... | 411/371.1 |

* cited by examiner

Primary Examiner—Neill Wilson
(74) Attorney, Agent, or Firm—Walter D. Ames, Esq.

(57) ABSTRACT

A fastener having a shank and head, the latter formed with a recess in its lower surface. A gasket is positioned in the recess, which it partially fills until the screw is employed to joint two elements and the gasket is compressed so that it fills the entirety of the recess, thereby preventing the ingress of undesirable materials.

8 Claims, 1 Drawing Sheet

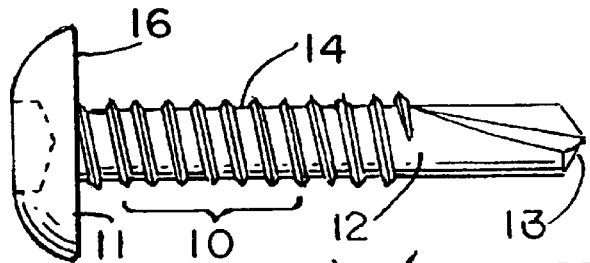
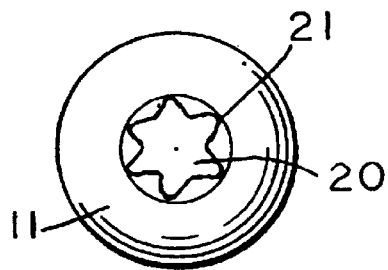
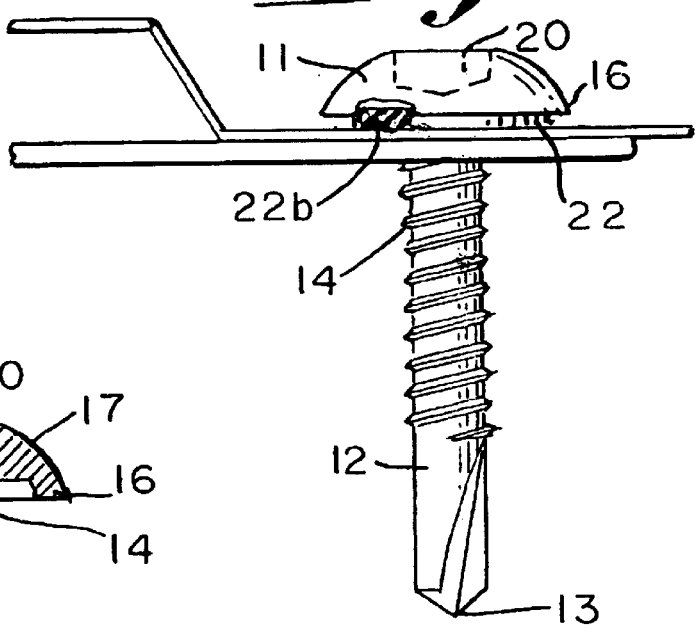
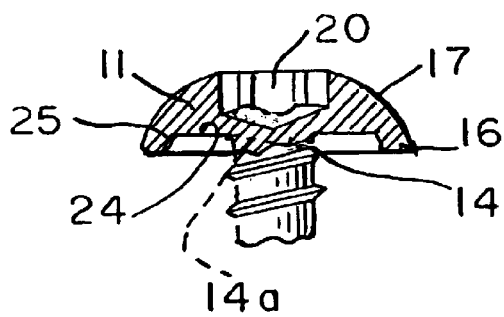
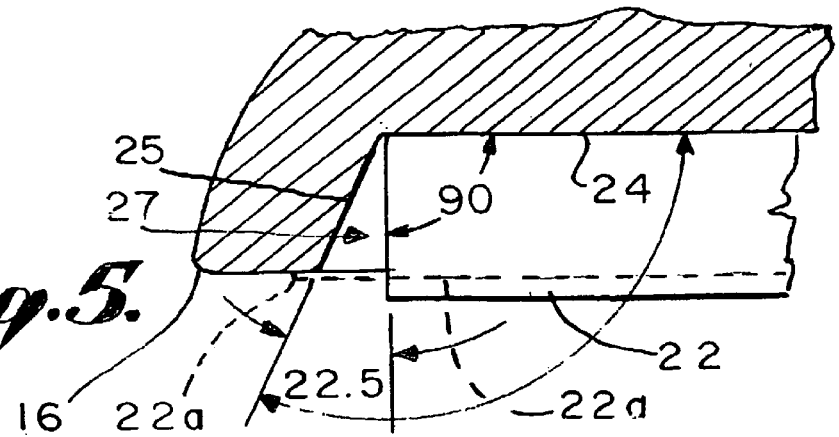

WEATHERPROOF FASTENER

This application claims the benefit of provisional patent application Serial No. 60/368,719, filed Apr. 1, 2002.

FIELD OF INVENTION

The present invention relates in general to fasteners. More specifically, it refers to fasteners such as screws for use in attaching a metal roof and wall panels to structural framing members to thereby erect a metal or post-frame building.

BACKGROUND OF INVENTION

In assembling metal and post-framed buildings, or metal and steel-framed buildings such as large sheds and barns, fasteners such as screws are used to secure metal parts like a metal roof and metal panels to a wood or steel frame that has been erected in the form of the ultimate structure. Such screws or other fasteners, either self-drilling or located in apertures previously formed and aligned in the metal and underlying wood, are inserted at predetermined intervals to hold the structure together. Yet it is not aesthetically pleasing to see row after row of screw heads projecting from the side of a building, and while attempts will often be made to obscure the screw heads by painting them over with paint the same color as the metal they secure, such attempts are often clumsy and do not succeed in obscuring the fasteners because the structure of the fasteners has not been designed to accomplish the purpose of diminishing their visibility.

Of course, the fasteners, e.g., screws are utilized to accomplish a purpose: to join a metal panel to a wood framing member, and such joinder must be weather-tight; it must secure the metal and structure so that no leakage of water or other environmental hazard enters the building through the aperture in which the fastener is located, whether that aperture is preformed or is formed by a screw with a self-drilling tip. Further, there must be no metal-to-metal contact, such as that between a metal screw and the metal roof or side wall panel of the structure that has been erected. When the two metals are of different compositions, as is usually the case, an electrical current may be generated and the result will be corrosion that will over time permit the entry of water at the galvanic site, and which also will be unsightly.

It is, therefore, a primary object of the present invention to provide such metal fasteners that will effectively secure metal roofs and panels to a wood or steel frame in such a manner as to prohibit the entry of water and other environmental liquids and solids from entering the apertures in which the shafts of the fasteners are located, and will also prevent galvanic action, and subsequent corrosion, caused by unintentional metal-to-metal contact in which the fasteners are one of the metals.

It is another object of my invention to provide metal fasteners for a metal or post-frame building in which the fasteners will be so unobtrusive that for most purposes they will be invisible to the naked eye absent close examination of the exterior of the structure.

SUMMARY OF INVENTION

The present invention comprises a metal fastener, including a screw or similar element and an associated gasket or washer for attaching a metal structural element to another element, which may typically be of metal or wood. The metal element of the fastener usually take the form of a screw the head of which has an outersurface and a lip depending from that surface, and which form between them a head body having an inner recess defined by the substantially flat inner surface of the body, and the inner surface of the lip. It is a particular feature of my invention that the inner surface of the lip intersects the inner surface of the body at an angle greater than 90 degrees, e.g., at an angle of between about 100 and 120 degrees, most preferably at an angle of about 112.5 degrees.

The present fastener also includes a gasket or washer that cooperates with the screw to effect a tight, weatherproof connection of two articles. The gasket is located to abut the inner recess of the screw head When the screw is not under pressure to join any articles, the deformable gasket is contiguous with the inner screw body surface, but space from the inner surface of the lip of the head body. However, when the screw is under stress to hold articles together, the washer is deformed to a position in which it is contiguous with both the body and lip inner surfaces, thereby filling the recess defined by those surfaces and preventing the ingress of unwanted rain water or other foreign materials. It is preferred that under compression the gasket not extend beyond the cylindrical plane defined by the annular lip of the screw head.

As additional features of my invention, the screw head is preferably of low-profile design, providing a smooth, convex, upwardly extending but trancated surface when in place. Also, the screw driving means may be indented from the outer surface of the head so that the driving means is located entirely within the outline of the uppoer surface of the head. In addition, in order to maintain the washer in place, it is preferred that the threads located along the periphery of the screw extend substantially to the plane of the inner surface of the head body.

These and other objects, features and advantages of my invention will be better understood when considered in conjunction with a preferred embodiment of the invention, which is illustrated in the accompanying drawings in which:

FIG. 1 is a side elevational view of a preferred fastener element according to my invention;

FIG. 2 is a top plan view showing the head of the fastener element of FIG. 1;

FIG. 3 is a side elevational view of the fastener element of FIG. 1, with the screw head shown partly in section to detail the interior of the head;

FIG. 4 is another side elevational view of the fastener, partly broken away, with a gasket in place, and FIG. 5 is an enlarged, diagrammatic view showing the interior of the screw head of the fastener.

DETAILED DESCRIPTION OF PREFERRED EMBODIMENT

Referring now to the drawings, the best mode of the invention as I presently contemplate it is there illustrated. FIG. 1 shows the basic element of the fastener, which is in the form of a screw indicated generally by the reference numeral 10, having a head 11 and an elongated shank 12.

The shank or shaft terminates at its distal end in a point 13 of such configuration that the fastener illustrated is a self-drilling screw, i.e., the shape of the tip 13 is such that the screw will in effect create its own aperture as it is drilled into the surfaces to be connected. As will be noted, the threads 14 of the fastener body or shaft or shank 12 in the illustrated self-drilling screw do not extend to the tip 13 of the shank. In the present invention the screw or fastener can also be of the gimlet type, which is usually more appropriate for use in a wood frame building and in which the threads extend to the tip of the screw shank.

At its proximal terminus the shaft 12 is joined to the screw head 11 in such manner that the thread 14, which in the illustrated embodiment does not extend to the tip 13 of the screw, does extend to the juncture of shaft 12 and head 11. Details of the structure of the screw head and shaft are illustrated in FIG. 3 as well as other Figures.

The structure of the head 11 is an important consideration in the ability of the present device to exclude foreign materials from the aperture formed by a screw used to join two structural building components such as components identified by reference numerals 30 and 31 shown in FIG. 4. In this best mode of FIG. 3, and also in FIG. 2, it will be seen that the body of the head 11 has a convex outer surface 17 and that the body is shaped with a depending, annular lip 16. The underside of the head body 11 is formed with a recess defined by the body inner surface 24 and the lip inner surface 25. It will also be seen in FIG. 3 that the screw thread 14 extends to the plane of body inner surface 24, as indicated at 14a.

Further, convex upper surface 17 of the screw head has been truncated at its apex rather than extending to form a complete, convex arc. At such centrally located, cut-away portion the head is formed with a cavity 20 in which a suitable driving tool can be inserted. As best seen in FIG. 2 of the drawings, a multi-lobed driving recess is preferred, and shown in that figure is a six-lobed driving recess, each lobe of which is identified by numeral 21. In practice it is preferred that the height of the low-profile head not exceed 0.2 inches, and it is even more preferred that the height of the head not exceed 0.15 inches.

An important part of my preferred screw head 11 relates to the shape of the recess under the head in which a deformable gasket is located. The gasket or washer 22, which may also be resilient and may be formed from natural or synthetic rubber, is located as illustrated in FIG. 4. As there shown, a gasket 22 of conventional, deformable material (see the partial section 22b) is located in the cavity or recess formed in the bottom surface 24 of the head 11. That annular cavity is defined by the inner surface 25 of the lip 16 and the undercut, bottom surface 24 the head. As best seen in FIGS. 4 and 5, the gasket 22 in non-work joining position is positioned contiguous with the bottom surface 24. As best seen in the enlarged view of FIG. 5, the inner lip surface 25 intersects the bottom surface 24 of the head at an obtuse angle such that the gasket 22 will sit against the bottom surface of the head when it is not under compression, leaving a space between the gasket and the inner surface 25. Under compressive force, the gasket 22 will extend in the direction of the retaining lip 16 and fully occupy the recess under the screw head. It is presently contemplated that an interior angle of about 112.5 degrees will be approximately that required so that, on compression, a conventional gasket will be compressed so that it extends to a location indicated by broken line 22a in FIG. 5 beneath but not to the edge of the lip 16, and certainly not beyond the edge 16 as to be readily observable when the fastening means is viewed from a distance.

Expressed otherwise, it is necessary that the gasket located in the undercut portion of the base of the head extend downwardly and outwardly a sufficient distance to prevent metal-to-metal contact between the screw and the panel being fixed in place. In order for the gasket 22 to underlie the entirety of the screw head, the angle between undercut surface 24 and transition surface 25 must be such as to permit some displacement of the gasket 22. On such compressive displacement the gasket underlies the entirety of the head 11, thus preventing damage to the paint finish of the panel and resilience of the gasket material, on compression the gasket will spread beneath the edge 16. If the angle that is presently most preferred, 112.5° between surface 24 and surface 25, is maintained, the gasket will be enabled to spread beneath the rim edge but not to a position in which it will protrude from the periphery of the head to the aesthetic detriment of the screw. See FIGS. 4 and 5. While the inherent deformability of the material from which the gasket is formed will influence the angle between the surfaces 24 and 25, it has been found that the aesthetics and function of the gasket can best be accomplished by utilizing an interior angle of about 100 to 150°, more preferably between about 110 to 120°, and most preferably about 112.5°.

It will be apparent to those of skill in this art that certain modifications and alterations may be made to the preferred embodiment a detailed description of which has been explicated hereinbefore without departing from the spirit of the invention. As to all such alterations and modifications, it is desired that they be included within the purview of my invention, which is to be limited only by the scope, including equivalents, of the following, appended claims.

I claim:

1. The combination of a screw rotatable between a position in which it does not join two pieces of work and another position in which it joins two or more pieces of work, and a gasket positioned between said screw and said work to enable said screw to maintain said work in a tight substantially weatherproof grasp, said screw comprising an elongated shaft having screw threads formed along at least a portion of its periphery and terminating at one end in a tip for penetrating said work, a screw head mounted at the end of said shaft opposite said tip, said head being formed with an outer surface extending general away from said shaft, said outer surface terminating in an annular lip depending from said outer surface in the direction of said shaft, said lip lying in a plane substantially normal to the axis of said shaft which plane constitutes the lowermost extension of said head, said outer surface and said lip forming between them a head body having a recess defined by the inner surface of said body and the inner surface of said lip, said body inner surface being substantially flat and lying in a plane substantially normal to the axis of said shaft, said lip inner surface being substantially annular and intersecting said body inner surface at an obtuse angle of between about 100 and 150 degrees, and said gasket comprising a deformable, electrically nonconductive article positioned in said head body recess and, when said screw is in non-work joining position, being located contiguous with said body inner surface and spaced from said lip inner surface when said screw is in non-joining position, and, when said screw is in work joining position, deformed to fill said recess and be contiguous with both said head body and lip inner surfaces and to extend beyond said plane of said annular lip to prevent contact between said head and said work.

2. A screw as claimed in claim 1, in which said outer surface of said head is substantially convex in form.

3. A screw as claimed in claim 2, in which said convex head outer surface has been truncated below its apex.

4. A screw claimed in claim 3, in which screw driving means is located at said truncated, convex head outer surface.

5. A screw as claimed in claim 1, in which said obtuse angle is between about 110 and 120 degrees.

6. A screw as claimed in claim 5, in which said obtuse angle is about 112.5 degrees.

7. A screw as claimed in claim 1, in which said lip also defines the outermost extension of said head, and said gasket does not extend away from said shaft beyond said lip when said screw is in non-joining or work joining position.

8. A screw as claimed in claim 1, in which said screw threads on said shaft extend to said screw head to assist in retaining said gasket in said head body recess.

* * * * *